US005977905A

United States Patent [19]
Le Chevalier

[11] Patent Number: 5,977,905
[45] Date of Patent: Nov. 2, 1999

[54] TARGET DETECTION METHOD AND DEVICE FOR WIDEBAND UNAMBIGUOUS PULSE DOPPLER RADAR

[75] Inventor: François Le Chevalier, Bourg la Reine, France

[73] Assignee: Thomson-CSF, Paris, France

[21] Appl. No.: 08/889,323

[22] Filed: Jul. 8, 1997

[30] Foreign Application Priority Data

Jul. 9, 1996 [FR] France ................................. 96 08509

[51] Int. Cl.[6] .......................... G01S 13/52; G01S 13/00
[52] U.S. Cl. ....................... 342/163; 342/110; 342/136; 342/196
[58] Field of Search .................................... 342/109, 110, 342/90, 95, 160, 163, 136, 196

[56] References Cited

U.S. PATENT DOCUMENTS 3,765,017 10/1973 Dentino .................................. 342/163
4,106,019 8/1978 Alexander et al. ..................... 342/110
5,115,246 5/1992 Thomas, Jr. et al. .

FOREIGN PATENT DOCUMENTS 0 336 273 10/1989 European Pat. Off. .

Primary Examiner—Ian J. Lobo
Attorney, Agent, or Firm—Oblon, Spivak, McClelland, Maier & Neustadt, P.C.

[57] ABSTRACT

Coherent bursts of N wideband, low repetition frequency width-modulated pulses are transmitted, and they are received with pulse compression and then sampling. For each range gate and each speed hypothesis, a selection is made of the corresponding samples of N repetitions of a burst after compensation for the migration in distance. On each set of N samples, for a given speed hypothesis, a Fourier transform and a threshold-setting operation are performed. The distance and the unambiguous speed of the detected targets are then extracted.

8 Claims, 3 Drawing Sheets

TARGET DETECTION METHOD AND DEVICE FOR WIDEBAND UNAMBIGUOUS PULSE DOPPLER RADAR

BACKGROUND OF THE INVENTION

The present invention relates to a method and a device for the detection of targets for a wideband, unambiguous pulse Doppler radar with low frequency of repetition and high distance resolution.

In modern surveillance radars in particular, the increase in their range obliges them to adapt usually to ambiguities in distance or speed. In distance; the ambiguities result from lack of knowledge of the transmission pulse producing an echo at a given point in time. The distance ambiguity is given by $D_a = c\,Tr/2$ where c is the velocity of light and Tr is the period of repetition of the pulses. The distance from a target is therefore known only to within the nearest multiple of $D_a$. In speed, the ambiguities arise out of the very principle of the measurement of the Doppler effect, based on the measurement of the progress of the phase shift between the local oscillator and the received echo, from one pulse to the next. This progress of the phase shift measures the movement of the target between two successive pulses, assessed in wavelengths: since the phase shift is measured only to the nearest $2\pi$, the speed is measured only within $V_a = \lambda/(2\,Tr)$, $V_a$ giving the ambiguity in speed.

This leads to the existence of blind speeds, every $V_a$ starting from the zero speed. For a ground radar, this leads to the elimination of all the possible targets moving close to these ambiguous speeds at the same time as the clutter, and therefore limits the domain of coverage (in speed) of the radar.

For a radar of sufficient range, these problems of ambiguities become large enough for an attempt to be made to cope with them by the transmission, in each direction of observation, of several bursts of pulses with different repetition frequencies (hence blind speeds). Unfortunately, this makes it necessary, in order to maintain a sufficient rate of renewal, to reduce the duration of each burst and hence lower the resolution in speed. It is possible to obtain a situation where the number of pulses in each burst is so small that anti-clutter Doppler filtering eliminates a major proportion of the targets.

To overcome these drawbacks, it becomes necessary to conceive of radars that are ambiguous both in distance and in speed: these are Mean Frequency of Repetition (MFR) radars. These radars are moderately ambiguous in distance and in speed (they show a few ambiguities) and it becomes possible to reconstitute the real distance and speed by transmitting a small number of coherent bursts in each direction, at the cost however of a certain degree of complexity due to the ambiguity removal processing operations and a generally acceptable reduction in the resolution in speed.

In the case of airborne nose-cone radars, where the clutter echoes received have radial speeds ranging from $-Vp$ to $+Vp$ (Vp being the speed of the carrier), the radars have several modes of operation, again because of problems of ambiguity. These are the High Frequency of Repetition mode (HFR operation, unambiguous in speed) for the detection of targets in approach mode, the Low Frequency of Repetition mode (LFR operation, unambiguous in distance) for upward sighting and the Mean Frequency of Repetition mode (MFR operation, ambiguous in distance and speed) for the detection and tracking of targets moving away. The removal of ambiguity is done according to the multi-burst principle described here above. In general, the values of resolution in distance of these radars is in the range of about a hundred meters in watching mode.

However, resolution in distance of this kind is quite insufficient for certain applications such as cartography by airborne radar using the synthetic antenna method or the method of threat analysis (raid analysis and target classification). The high values of resolution in distance that are needed extend from some meters to some decimeters. They are generally obtained by pulse compression or by synthetic bands (the transmission of successive coherent bursts or bursts interlaced at different carrier frequencies).

These modes with high distance resolution generally avoid the problems of ambiguity by the fact that they are limited to certain conditions of operation. In cartography, the radar used is of the LFR type, and the speed domain is limited to the unambiguous domain. In threat analysis, the target is designated in advance, generally by another radar mode, and only the distance-speed domain corresponding to this designation is analyzed.

However, it is clear that a radar with high resolution in distance that is, at the same time, unambiguous, would be of very great value. One of the problems that emerge immediately, is that of the migration of the targets in distance. Indeed, owing the high resolution in distance, hence the small width of the range bins, a moving target does not remain in the same range bin between the first repetition and the last repetition of a period of analysis (burst of pulses). This does not enable the application of standard Doppler analysis, range bin by range bin.

SUMMARY OF THE INVENTION

The invention is aimed at overcoming these drawbacks.

In particular, an object of the invention is a method of target detection for wideband unambiguous pulse Doppler radar based on compensation for the migration in distance before the Doppler analysis for each speed hypothesis.

According to the invention, there is therefore provided a method of target detection for wideband unambiguous pulse Doppler radar of the type with low repetition frequency and high distance resolution, wherein a burst of H coherent pulses is transmitted, the distance resolution $\delta R$, the pulse repetition period and the duration of the burst being such that there occurs a migration in distance that is greater than a range bin with a width $\delta R$ for a target having a speed equal to the ambiguous speed of the radar, wherein said method comprises the steps of:

making a search; for each range gate, for the samples of the received signal corresponding to the N repetitions of the burst for each hypothesis of real speed of a target;

carrying out the Doppler analysis of the echoes received on the N repetitions for each range gate and speed hypothesis, and extracting the information elements on each detected target from the rank of the range gate, giving the distance of the target, and from the result of the Doppler analysis and of the corresponding speed hypothesis giving the unambiguous speed of the target.

According to another aspect of the invention, there is also provided a target detection device for wideband unambiguous pulse Doppler radar of the type with low repetition frequency and high distance resolution, said radar comprising a transmitter to transmit a burst of N coherent pulses, the distance resolution $\delta R$, the pulse repetition period and the duration of the burst being such that there occurs a migration in distance greater than a range bin with a width δR for a target having a speed equal to the ambiguous speed of the radar, and reception means to give samples of signals received during each of the repetitions of the burst, said device implementing the method explained here above, wherein said device comprises:

means to make a search, for each range gate, for the samples of the received signal corresponding to the N repetitions of the burst for each hypothesis of real speed of a target;

means for the computation of the Fourier transform of said samples selected by said search means;

means for the comparison of the results of said Fourier transform with a predetermined threshold to detect the presence of a target; and means of extraction to provide the information on distance and unambiguous real speed of each detected target.

BRIEF DESCRIPTION OF THE DRAWINGS

The invention will be understood more clearly, and other features and advantages shall appear from the following description and the appended drawings, of which.

DESCRIPTION OF THE PREFERRED EMBODIMENTS

As already mentioned, the method according to the invention can be applied to a pulse Doppler radar of the type with low frequency of repetition (LFR, unambiguous in distance) and high distance resolution, hence with wideband In such a case, there occurs a phenomenon of migration in distance that may be appreciable over the duration of the coherent burst transmitted. If v represents the real radial speed of a target, N the number of pulses of the burst and Tr the pulse repetition period, there is migration if:

$$Nv\ Tr > δR$$

where δR is the distance resolution (and the width of a range bin from the radar).

The processing in watch mode, for each distance/speed hypothesis that can be envisaged, namely for each hypothesis of delay of the received signal with respect to the transmitted pulse, pulse-to-pulse distance migration and pulse-to-pulse phase-shift of the echoes received, consists in compensating for this migration before performing the Doppler analysis. For each speed hypothesis, the echoes received from each transmitted pulse are collected, in taking account of the migration in distance, and they are summated after being reset in phase. This may be done, for example, by means of a Fourier transform or by correlation with a replica of the expected signal.

Figure 1:
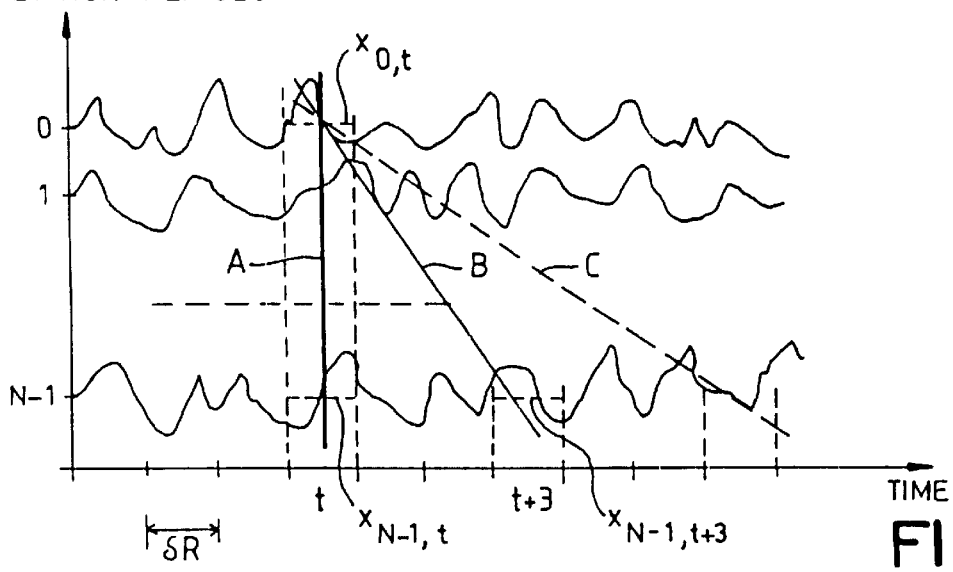
FIG. 1 is a graph explaining the principle of the method according to the invention.

FIG. 1 is a graph explaining this processing operation. The signal as a function of time for each repetition 0 to N−1 is shown, and the figure considers the case of the processing of the range bin or gate t (relative to the repetition 0).

For a target at low speed (with no distance migration), the Doppler analysis is done with the samples $x_{0,t}$ to $x_{N-1,t}$, positioned along the straight line A. For a hypothesis of a faster target whose shift is symbolized by the straight line B, a migration in distance of three bins is observed and the Doppler analysis will be done with the samples encountered along B from $x_{0,t}$ up to $x_{N-1,t+3}$. It is the same for the straight line C corresponding to a hypothesis of higher speed. Here we have considered hypotheses of targets moving away.

Naturally, the same operations are performed for hypotheses of approaching targets, the straight lines being then inclined in the other direction (towards closer bins for the last repetitions).

Figure 2:
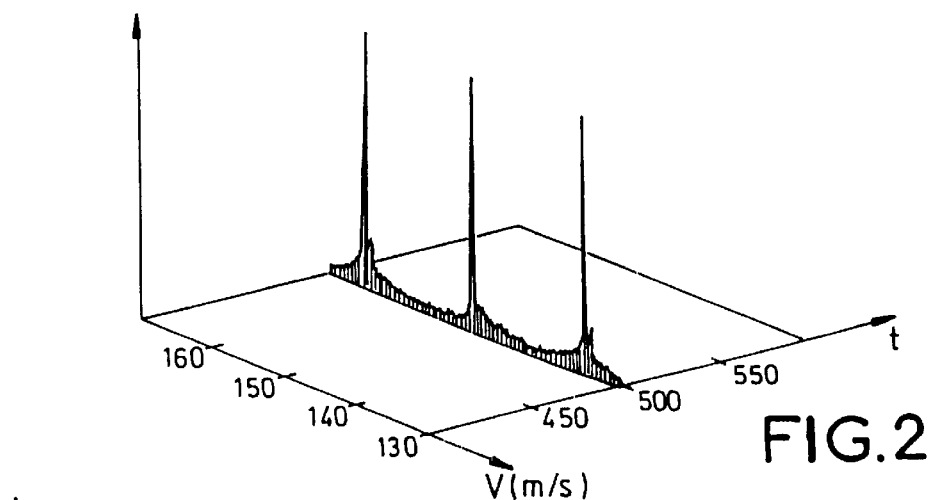
FIG. 2 is a graph of the ambiguity function when there is no distance migration.
Figure 3:
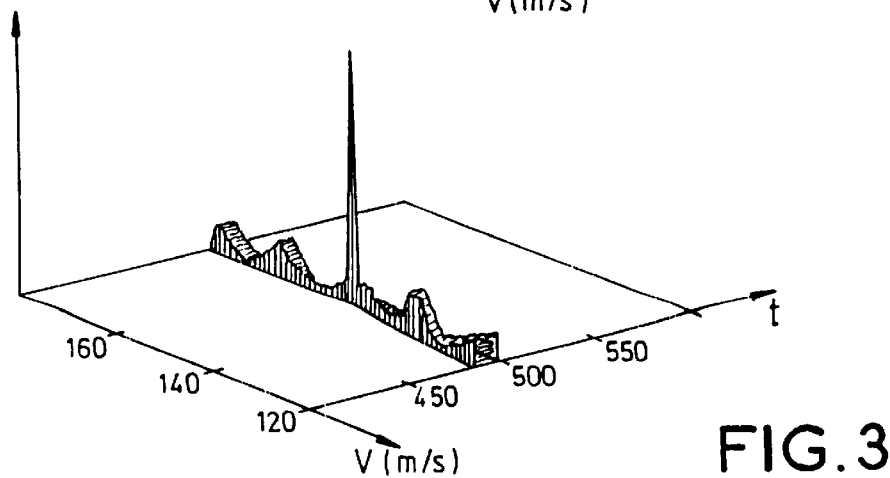
FIG. 3 shows the ambiguity function in the case of the method according to the invention.

To illustrate the essential differences between a standard processing operation and the processing according to the invention, FIG. 2 shows the ambiguity function of an LFR radar with a narrow frequency band (negligible distance migration) and FIG. 3 shows the ambiguity function with a processing operation according to the invention as described here above for a standard LFR radar with high distance resolution (wide-band).

The example is based on the assumption of a radar using a 3 cm wavelength, a burst of 30 pulses and a repetition period of 1 ms for a target having a speed V of 150 m/s (multiple of the ambiguous speed). In the case of FIG. 2, with a pulse duration of 1 μs, we note the presence of regular peaks in speed expressing the ambiguities in speed of a standard narrow-band LFR radar.

Figure 4:
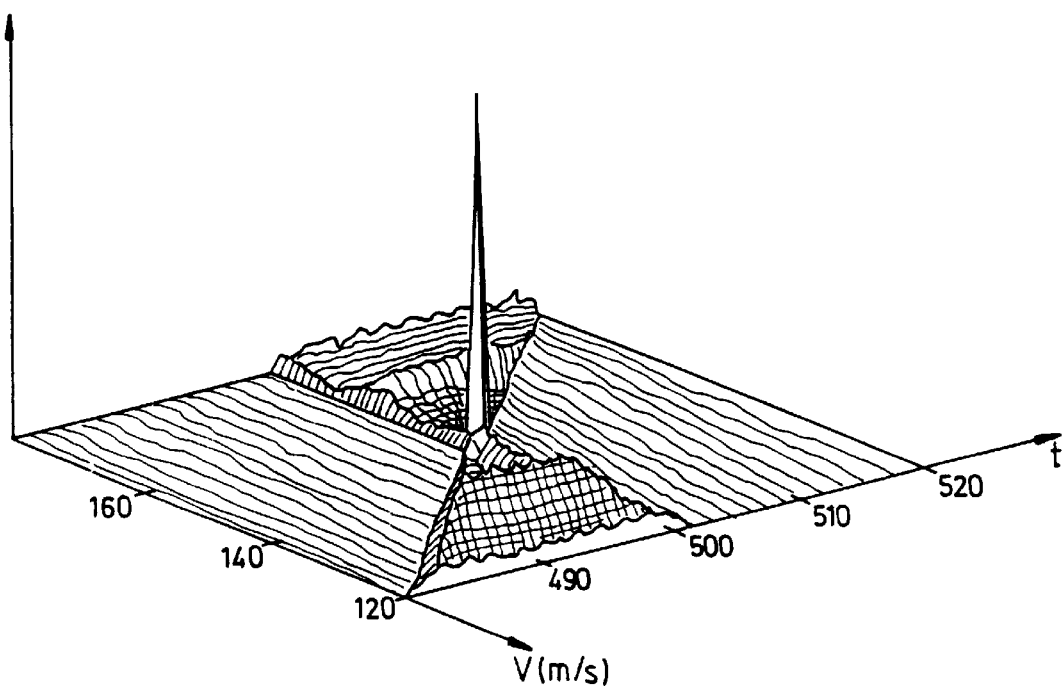
FIG. 4 shows an enlarged part of the graph of FIG. 3.

On the contrary, in the case of FIG. 3, with a pulse duration of 1 ns, these peaks, apart from the central peak, are attenuated. Furthermore, a rise in the minor lobes is observed between these peaks, with a triangular spread that can be seen more clearly in FIG. 4 which is a graph that is enlarged except along the axis of the speeds. For a hypothesis of distance $D_{o+d}$ slightly greater than the distance $D_o$ from the target and a hypothesis of speed $V_o+v$ slightly greater than the speed $V_o$, it is clear (according to FIG. 1) that the straight lines along which the summation in phase of the received signals is done include a common part where the signals received for the two hypotheses arise out of the same range bins. Thus, the target $D_o$, $V_o$ contributes slightly to the output of the processing in $D_{o+d}$, $V_o+v$, whence the minor lobes observed.

In view of these observations, we shall now specify the characteristics of the method according to the invention. The waveform used has the following properties:

it has low frequency of repetition, so as to ensure that there is no distance ambiguity;

it has high distance resolution, typically smaller than one meter, hence a wide frequency band, the repetition period Tr, the number N of pulses per coherent burst and the distance resolution δR are defined in such a way that the migration in distance, for a target at the ambiguous speed $V_a=\lambda/(2\ Tr)$, is appreciable over the duration Ntr of the burst, namely greater than a range bin.

For example, for an X band radar (λ=3 cm) with a repetition period of 1 ms leading to an ambiguous speed of 15 m/s, it is possible, for a 50-pulse burst, to adopt a distance resolution of 15 cm (giving a bandwidth of 1 GHz), leading to a migration of 5 range bins on the duration of the burst for a target moving at 15 m/s.

The method according to the invention consists in combining this waveform with a processing operation that explores all the hypotheses of speed beyond the ambiguous speed according to the principle explained with reference to FIG. 1. More specifically, therefore, <<coarse>> values of speed V are chosen, spaced out by a pitch ΔV such that the incrementation of the distance migration is, at the maximum, equal to one range bin between the first and the last repetition, giving NΔV Tr≦δR.

For reasons of connection balance, it is necessary in most cases to resort to pulse compression to obtain a bandwidth of 1 Ghz. For example, 1 μs pulses can be compressed to 1 ns.

The waveform used is particularly advantageous for its resistance to scrambling and its discretion owing to the great bandwidth used.

Figure 5:
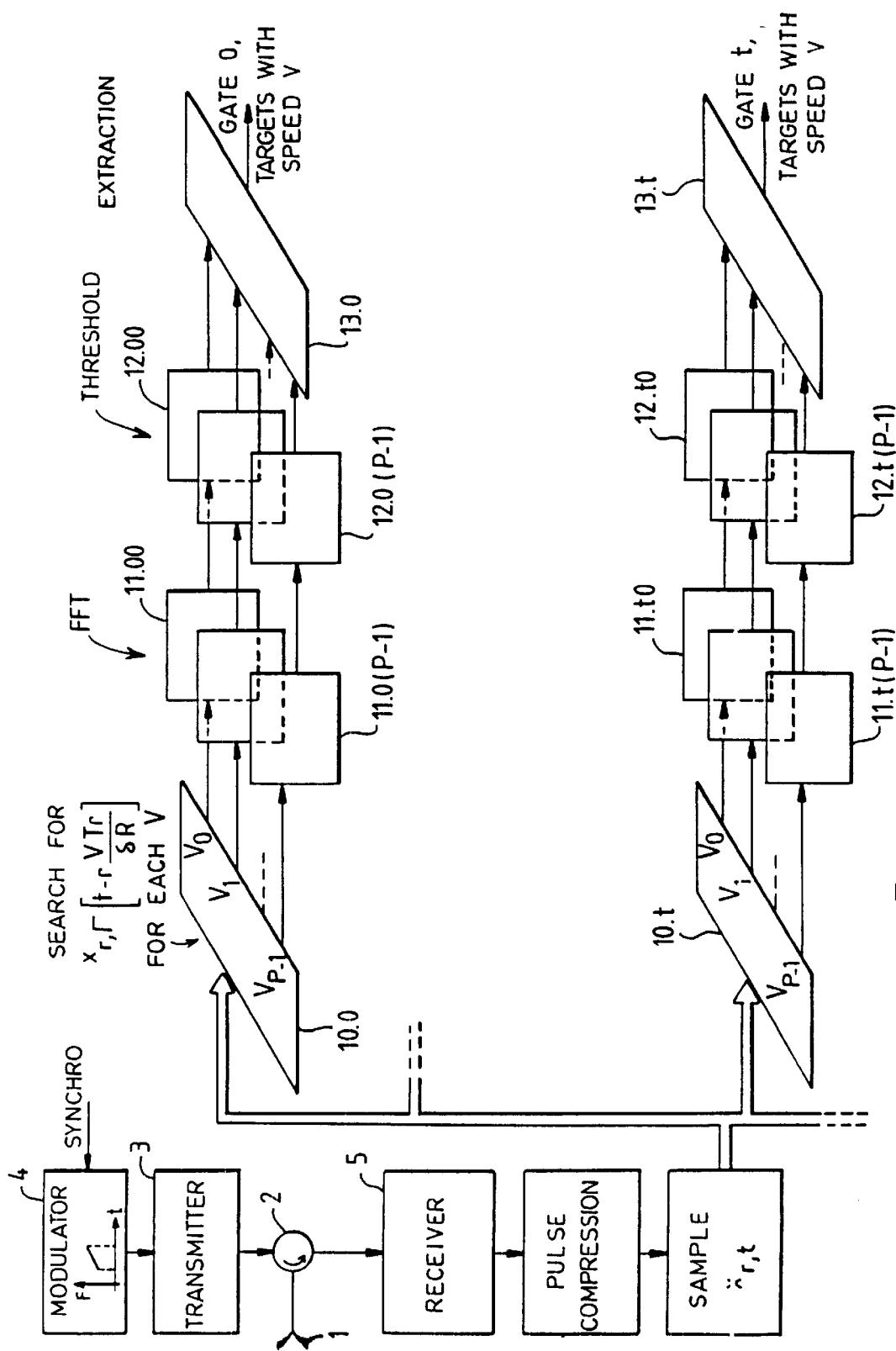
FIG. 5 is a schematic drawing of an embodiment of the device implementing the method according to the invention.

The method according to the invention can be implemented, for example by means of a device according to the embodiment of FIG. 5.

This FIG. 5 gives a very schematic view of the transmission part and the initial part of the reception channel.

A transmitter 3 modulated by a modulator 4 according to the waveform mentioned, i.e. giving, for example, frequency-modulated pulses, sends the wave to be transmitted onwards to an antenna 1 by means of a circulator 2.

The signals received by the antenna 1 are sent by the circulator 2 to a standard receiver 5 followed by a pulse compression device 6. The signals are then sampled and digitized by a circuit 7 that delivers the samples $x_{r,t}$ where r, the order number of the repetition, varies between 0 and N−1 and t is the rank of the range bin or gate corresponding to the sample.

The target detection device according to the invention comprises as many identical processing channels as there are range gates to be analyzed. Two of these channels, corresponding to the 0 order and t order range gates, have been shown. Each channel comprises first of all a search device 10.0 ... 10.t ... to carry out a search, from among all the samples provided by the circuit 7, for the samples corresponding to the range gate considered for each coarse speed hypothesis. Thus, at the output corresponding to the assumed speed of the target, the search device gives, for the range gate t, the samples:

$$x_{r,\Gamma}\left[t - r\frac{VTr}{\delta R}\right]$$

where Γ[ ] designates the integer closest to the quantity between square brackets. V negative is taken for a target moving away. For each speed V, the samples, compensated for as regards migration in distance, are sent to a Fourier transform circuit 11.00 to 11.0 (P−1), ... ; 12.t0 to 12.t (P−1) followed by a threshold circuit 12.00 to 12.0 (P−1), ... , 12.t0 to 12.t (P−1).

The Fourier transform circuit, which is for example a circuit to compute the Fast Fourier Transform for the distance tδR and the speed hypothesis V, computes the signal level according to the relationship:

$$T_{t\delta R, V} = \sum_{r=0}^{N-1} x_{r,\Gamma\left[t-r\frac{VTr}{\delta R}\right]} \cdot e^{-j2\pi r \frac{F_o}{F_r} \frac{2V}{c}}$$

In taking N different values of V distributed in a domain with a width $$\pm \frac{\lambda_o F_r}{4}$$

around V, the coarse value of the speed, it is possible, by Fourier transform, to compute N signal values that can be used to obtain the fine value of the speed for each Fourier transform circuit.

An extraction circuit 13.0, ... , 13.t, makes it possible, on the basis of the coarse speed information and the fine speed information given by the output of the Fourier transform circuit whose level has gone beyond the predetermined threshold, to deliver information on target presence at the distance tδR and at the unambiguous fine speed $V_f$ deduced from the coarse speed information V and from the fine speed information given by the corresponding FFT circuit.

The making of the target detection device according to the invention does not necessitate any new element on the transmission side. Indeed, there are known transmitters and antennas working in X band with a relative band of 10%, capable of modulating the transmitted pulses to obtain the pulse compression.

The reception channels must be adapted to the bandwidth, especially as regards the wideband analog/digital conversion.

From the viewpoint of the processing operation, the required capacities are great since the passband is approximately 1000 times greater than that of standard radars. Thus, it is possible to envisage a case where this wideband LFR mode of operation is installed for only a part of the range windows.

It can be noted that the condition laid down for the migration in distance for the ambiguous speed is expressed by $N V_a Tr = N\lambda/2 > k \delta R$ with $k \geq 1$ and that the value of k sets the level of the minor lobes of the ambiguity function (it is possible, for example, to take k equal to 4 or 5).

Naturally, the exemplary embodiment described in no way limits the scope of the invention.

What is claimed is:

1. A method for detecting a target with a wideband Doppler radar, comprising the steps of:

transmitting a burst of N coherent pulses with a low pulse repetition frequency,
   a wideband of said N coherent pulses corresponding with a high range resolution δR, which is a measure of radar range bin width,
   a pulse repetition period and pulse burst duration of said N coherent pulses being restricted such that a migration in target distance, as represented by a progression in range of an observed target echo between a first and a last repetition of said burst, is greater than the radar range bin width, for a target having a speed equal to an ambiguous speed detectable by the Doppler radar;

receiving and sampling a return signal;

searching samples of the return signal corresponding to each repetition period of said burst of N coherent pulses for each radar range bin and each speed hypothesis of a real speed of the target;

Doppler analyzing the samples for each radar range bin and speed hypothesis and obtaining N signal values corresponding with a fine target speed value having a greater resolution than each of the speed hypotheses; and extracting information elements on each detected target from a rank of a range bin corresponding with a distance of the target, and
   from the fine target speed value of the Doppler analyzing step and a corresponding speed hypothesis that gives an unambiguous speed of the target.

2. A method according to claim 1, wherein:

said searching step includes determining a sample for each radar range bin and speed hypothesis in each pulse repetition that corresponds to an amount of compensation for the migration in distance due to a target speed corresponding to said hypothesis.

3. A method according to claim 2, wherein:

said searching step includes searching the samples such that each speed hypothesis corresponds to successive coarse values of the speed of the target separated from one another by an incremental value ΔV, such that ΔV induces no migration in distance greater than one radar range bin width between a first repetition and a last repetition of the pulse burst.

4. A method according to claim 3, wherein:

said searching step includes, for each pulse repetition r, selecting a sample, for a radar range bin t and a speed V, having a rank equal to an integer part of $$t - r\frac{VTr}{\delta R},$$

where Tr is the repetition period.

5. A method according to claim 4, wherein:

said selecting step includes selecting the sample such that the incremental value ΔV is chosen such that:

$$\Delta V \leq \frac{\delta R}{NTr}$$

where δR equals C/2B, where C is a velocity of light and B is a frequency band of the radar.

6. A method according to claim 1, wherein:

said Doppler analyzing step includes summing samples selected for each radar range bin and speed hypothesis after resetting the samples in phase and comparing sums of the samples obtained against a threshold so as to determine an existence, or nonexistence of the target.

7. A method according to claim 6, wherein:

said Doppler analyzing step includes computing a Fourier transform of selected samples according to a relationship:

$$T_{t\delta R, V} = \sum_{r=0} x_{r,\Gamma} \left[ t - r\frac{VTr}{\delta R} \right] e^{-j2\pi r \frac{Fo}{Fr} \frac{2V}{c}}$$

where $T_{t\delta R}$, v represents the level of the signal obtained by the Doppler analysis for the distance tδR and the coarse speed v, $$\Gamma\left[t - r\frac{VTr}{\delta R}\right]$$

represents an integer closest to $$t - r\frac{VTr}{\delta R},$$

and Fo represents a transmission frequency.

8. A wideband Doppler radar for detecting a target, comprising:

means for transmitting a burst of N coherent pulses, including
 means for transmitting and receiving said N coherent pulses corresponding with a high range resolution δR, δR being a measure of radar range bin width, and
 means for restricting a pulse repetition period and pulse burst duration of said N coherent pulses such that a migration in target distance, as represented by a progression in range of an observed target echo between a first and a last repetition of said burst, is greater than the radar range bin width δR, for a target having a speed equal to an ambiguous speed detectable by the Doppler radar;

means receiving and sampling a return signal;

means for searching samples of the return signal corresponding to each repetition period of said burst of N coherent pulses for each radar range bin and each speed hypothesis of a real speed of the target;

means for performing a Fourier transform on the samples selected by the means for searching so as to obtain a fine speed value;

means for comparing the fine speed value with a predetermined threshold and for detecting a presence of the target; and means for extracting information on distance and unambiguous real speed of each detected target after detecting said presence of the target.

* * * * *